Aug. 2, 1949.
M. N. MOSSEL
2,478,122
CORN-ON-COB BUTTERER
Filed Jan. 8, 1946
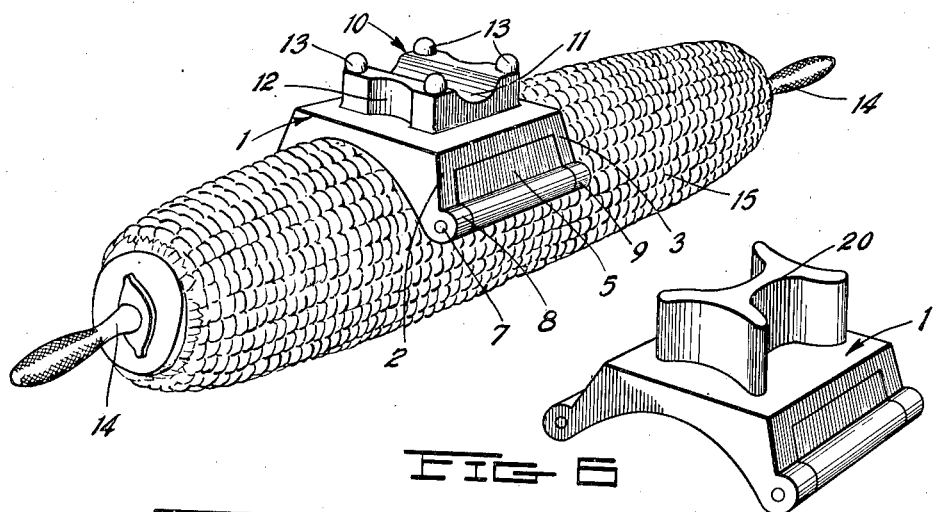
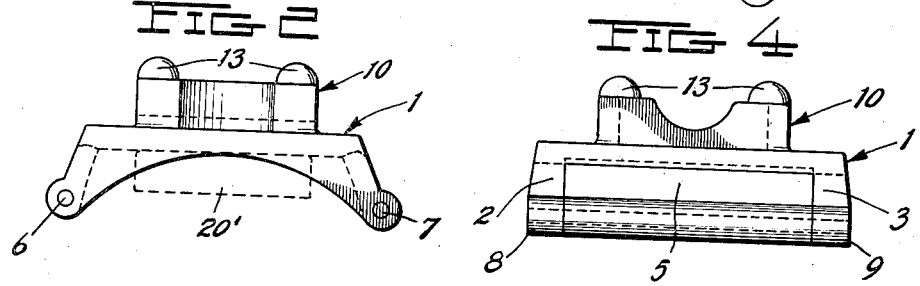
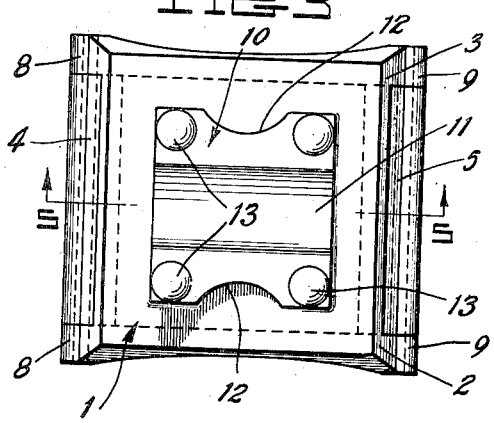
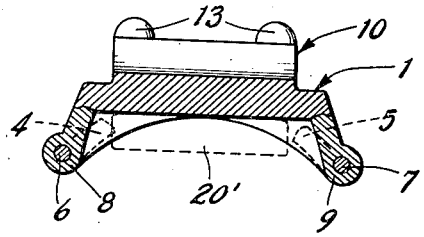
*Inventor*
Max N. Mossel
By Clarence A. O'Brien
and Harvey B. Jacobson
*Attorneys*

Patented Aug. 2, 1949

2,478,122

UNITED STATES PATENT OFFICE 2,478,122

CORN-ON-COB BUTTERER

Max N. Mossel, Fulton, Mo.

Application January 8, 1946, Serial No. 639,874

4 Claims. (Cl. 65—12)

This invention relates to improvements in eating devices or implements, and more particularly to a device which will be used to butter an ear of corn.

An object of the invention is to provide an improved corn buttering device which will include means for supporting a pat of butter and different means for spreading the butter over the surface of the corn kernels on a cob of corn.

A further object of the invention is to provide a buttering device for ear corn, which will quickly and thoroughly butter an ear of corn without soiling the fingers and without the wasteful messiness of using a knife to apply the butter.

A still further object of the invention is to provide a corn-on-cob buttering device which will be highly efficient in operation and relatively inexpensive to manufacture and produce.

Other objects will appear as the description proceeds.

In the accompanying drawings which form a part of this application,

Figure 1 is a perspective view of an ear of corn showing the improved corn buttering device in position thereon;

Figure 2 is an end elevation of the improved corn buttering device;

Figure 3 is a plan view of the corn buttering device;

Figure 4 is a side elevation of the corn buttering device;

Figure 5 is a sectional view taken on the line 5—5 of Figure 3; and

Figure 6 is a perspective view of the device showing a modified form of handle of substantially H-shape.

Like characters of reference are used throughout the following specification and the accompanying drawings to designate corresponding parts.

In carrying out the invention, there is provided a body member generally denoted by the reference numeral 1, the same being substantially square in shape, and formed with the arcuate-shaped end supporting or bearing ribs 2 and 3, the opposite sides of said body 1 being cut out or recessed to receive the inwardly directed side arms 4 and 5, which are secured to the shafts 6 and 7, the extremities of which are pivotally supported in the bearing ears 8 and 9 formed at the terminal ends of the said ribs 2 and 3, respectively.

A handle portion generally denoted by the reference numeral 10 comprises an upstanding extension substantially square in shape and inset from the upper surface of the main body 1. A transverse groove 11 is formed in the upper surface of the hand engaging portion 10, and vertically extending notches 12 are formed in the opposite ends of the portion 10, whereby the notches may be engaged by a thumb and the middle finger, while the index finger is placed in the transverse groove 11, to more firmly grasp the device and to place a desired degree of pressure on the device as it is slid up and down an ear of corn during the buttering operation.

Four dome-shaped legs 13 will be formed at the four upper corners of the portion 10, and when the device is not in use, it will be inverted and supported on a table (not shown) upon its four dome-shaped legs.

A modified form of handle for the device 1 is illustrated in Figure 6 of the drawings, and comprises an upstanding handle member 20 of substantially H-shape in cross-section.

The method of operation is believed to be clear, but will be outlined as follows:

Assuming the device is placed on a table on its four supporting legs and a pat of butter 20' is placed in the center of the main body 1, by grasping the device with the thumb and middle finger in the notches 12 and placing the index finger in the groove 11, the device will be placed upon the kernels of an ear of corn and slid back and forth, thus thoroughly buttering the corn. Suitable corn ear supporting forks or picks 14 will be stuck in the ends of the ear of corn, and the same may be eaten without soiling the fingers, an obvious advantage over the old method of buttering corn with a knife.

While the preferred embodiment of the invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A corn butterer comprising a body member having a pair of spaced parallel bearing ribs, said ribs having concaved outer edges, and a pair of spaced, elongated, gripping members pivotally mounted between said ribs and having free longitudinal edges cooperating to retain a pat of butter between said ribs and relative to said body.

2. A corn butterer comprising a body member having inner and outer faces, a pair of spaced ribs projecting outwardly from the inner face of said body member and having outer concaved edges, opposed pairs of ears at the ends of said ribs, a pin carried by each opposed pair of ears and extending between said ribs, a pair of pivotal gripping members mounted on said pins for outward swinging movement relative to the inner face of said body member, said gripping members cooperating to retain a pat of butter relative to said body member, and hand grip means carried by the outer face of said body member.

3. A corn butterer comprising a body having a pair of spaced ribs projecting outwardly from one face of said body member, said ribs having concaved outer edges, said ribs having terminal ears, a pair of spaced pins extending between said ribs and having ends journaled for rotation in said ears, a pair of gripping members disposed between said ears and mounted on said pins, said gripping members having free longitudinal edges disposed inwardly of said ears and adapted to cooperate in gripping a pat of butter, and finger grip means carried by said body member.

4. A corn butterer comprising a body having a pair of spaced ribs projecting outwardly from one face of said body member, said ribs having concaved outer edges, said ribs having terminal ears, a pair of spaced pins extending between said ribs and having ends journaled for rotation in said ears, a pair of gripping members disposed between said ears and mounted on said pins, said gripping members having free longitudinal edges disposed inwardly of said ears and adapted to cooperate in gripping a pat of butter, an extension projecting from said body member and having an outer surface and a pair of end edges, a transverse groove provided in the outer surface of said extension adapted to receive the index finger of a user, and notches provided in the end edges of said extension for receiving the thumb and middle finger of a user.

MAX N. MOSSEL.

REFERENCES CITED

The following references are of record in the file of this patent:

UNITED STATES PATENTS

| Number | Name | Date |
|---|---|---|
| 90,522 | Gilroy | May 25, 1869 |
| 126,333 | Rickards, Jr. | Apr. 30, 1872 |
| 287,080 | Anderson | Oct. 23, 1883 |
| 500,823 | Stroberger | July 4, 1893 |
| 523,025 | Van Wormer | July 17, 1894 |
| 688,668 | Myers | Dec. 10, 1901 |
| 917,517 | Altman | Apr. 6, 1909 |
| 959,793 | Packer | May 31, 1910 |
| 1,056,050 | Nyberg | Mar. 18, 1913 |
| 1,097,465 | Pratt | May 19, 1914 |
| 1,145,966 | Bergmann | July 13, 1915 |
| 1,774,567 | Raphael | Sept. 2, 1930 |
| 2,257,970 | Long | Oct. 7, 1941 |
| 2,434,861 | Pachner | Jan. 20, 1948 |